United States Patent
Wang

(10) Patent No.: US 9,672,988 B2
(45) Date of Patent: Jun. 6, 2017

(54) HIGH-VOLTAGE PULSE DISCHARGE CAPACITOR AND MANUFACTURING METHOD THEREOF

(71) Applicant: GYRK INTERNATIONAL TECHNOLOGY CO., LTD., Beijing (CN)

(72) Inventor: Hai Wang, Beijing (CN)

(73) Assignee: Gyrk International Technology Co., Ltd. (CN)

( * ) Notice: Subject to any disclaimer, the term of this patent is extended or adjusted under 35 U.S.C. 154(b) by 99 days.

(21) Appl. No.: 14/769,404

(22) PCT Filed: Feb. 21, 2014

(86) PCT No.: PCT/CN2014/072355
§ 371 (c)(1),
(2) Date: Aug. 20, 2015

(87) PCT Pub. No.: WO2014/127729
PCT Pub. Date: Aug. 28, 2014

(65) Prior Publication Data
US 2016/0217932 A1  Jul. 28, 2016

(30) Foreign Application Priority Data
Feb. 22, 2013 (CN) .......................... 2013 1 0056565

(51) Int. Cl.
*H02J 7/00* (2006.01)
*H01G 4/38* (2006.01)
(Continued)

(52) U.S. Cl.
CPC .................. *H01G 4/38* (2013.01); *H01G 2/02* (2013.01); *H01G 2/14* (2013.01); *H02J 7/007* (2013.01); *H02J 7/0063* (2013.01); *H02J 7/345* (2013.01)

(58) Field of Classification Search
CPC .................................................. H02M 3/1582
(Continued)

(56) References Cited

U.S. PATENT DOCUMENTS

| 5,367,437 A | 11/1994 | Anderson |
| 6,421,362 B1 * | 7/2002 | Matsunaga ........... H01S 3/0975 320/161 |
| 2012/0268074 A1 | 10/2012 | Cooley et al. |

FOREIGN PATENT DOCUMENTS

| CN | 2919548 | 7/2007 |
| CN | 101593623 | 12/2009 |

(Continued)

OTHER PUBLICATIONS

International Search Report for PCT Application PCT/CN2014/072355 mailed May 21, 2014 (4 pages).

*Primary Examiner* — Suresh Memula
(74) *Attorney, Agent, or Firm* — Barnes & Thornburg LLP; Jeffrey R. Stone

(57) ABSTRACT

A high-voltage pulse discharge capacitor of an elongated structure comprises a capacitor body. The capacitor body comprises several high-voltage capacitor parallel units and a high-voltage capacitor core pack. The several high-voltage capacitor parallel units are mutually connected in parallel. The high-voltage capacitor parallel units connected in parallel are then connected as a whole with the high-voltage capacitor core pack in parallel. The high-voltage capacitor parallel unit comprises two capacitor core packs. The two capacitor core packs are mutually connected in parallel. The capacitor core packs connected in parallel are wrapped with a PP film and purple copper foil at an outer side integrally. The purple copper foil is connected to axial faces located at a head and a tail of a combination integral of the two capacitor core packs. Using a preceding parallel connection mode enables the capacitor to provide greater current when (Continued)

discharging electricity, reduces heat generated by internal resistance when the capacitor discharges the electricity, and prolongs a service life of the capacitor.

8 Claims, 8 Drawing Sheets

(51) Int. Cl.
*H01G 2/02* (2006.01)
*H01G 2/14* (2006.01)
*H02J 7/34* (2006.01)

(58) Field of Classification Search
USPC .......................................................... 320/108
See application file for complete search history.

(56) References Cited

FOREIGN PATENT DOCUMENTS

| CN | 102446628 | 5/2012 |
| CN | 102723197 | 10/2012 |

* cited by examiner

Red copper electrode A

Red copper electrode B

Red copper electrode A

Red copper electrode B

HIGH-VOLTAGE PULSE DISCHARGE CAPACITOR AND MANUFACTURING METHOD THEREOF

TECHNICAL FIELD

The present disclosure relates to a high-voltage pulse discharging capacitor and a manufacturing method thereof.

BACKGROUND

A pulse capacitor is an electrical element which is used for storing electric energy and capable of releasing the electric energy in a very short time, and is one of the most widely used pulsed power supplies. The pulse capacitor is mainly used for high-voltage experiment devices such as an impulse voltage generator, an impulse current generator, an impulse voltage divider and an oscillation circuit, and can also be applied to fields such as electromagnetic forming, hydro-electric crushing, stored energy welding and geological exploration. Due to the size limitation of a drill rod, a high voltage pulse capacitor used for geological exploration has to be made into a slender shape, and according to the structure of the drill rod, common capacitors need to be made into a structure with a diameter of 50-100 mm and a length of about 2 m. The pulse capacitors are all formed by combining cores of multiple capacitors in series or in parallel. The high voltage pulse capacitor for well exploration is generally made into a serial structure, but such a structure cannot meet the demand of high current discharge.

A production process of a film capacitor is as below: after winding a metallized film into a capacitor core, two ends are subjected to metal spraying firstly, and then a lead is welded on the metal spraying layer for leading out. Generally, the welding of a lead is performed manually, but welding time and welding temperature cannot be accurately controlled, and the film will shrink if the welding temperature is overhigh and the welding time is overlong, which will influence the contact resistance of the metal spraying layer. Even if a welding method with controllable time and temperature is adopted, since the soldering temperature and welding heat are far beyond the tolerance of the film, the damage to the metallized film caused by lead soldering on the metal spraying layer cannot be avoided. During pulse discharging of heavy current, the influence of the resistance change of the metal spraying layer caused by welding on the discharging service life of the capacitor is particularly serious. The traditional film capacitor terminal leading-out method makes it difficult for the service life of a metallized film capacitor to break through the extremity of 10 A/m and 0.1 million times of discharging.

SUMMARY OF THE INVENTION

Technical Problem to be Solved

The disclosure aims to provide a high-voltage pulse discharging capacitor and a manufacturing method thereof. The high-voltage pulse discharging capacitor has a loss smaller than 0.01%, and has excellent discharging performance, for example, the peak discharging current of a metallized film core with a diameter of 60 mm is 10KA and the metallized film core is allowed to be discharged for more than 0.1 million times.

Technical Solutions

The aim of the disclosure is realized by the following scheme:

a high-voltage pulse discharging capacitor comprises a capacitor body which includes several high-voltage capacitor parallel units and a high-voltage capacitor core package; the several high-voltage capacitor parallel units are connected in parallel, and the high-voltage capacitor parallel units connected in parallel, as a whole, are connected with the high-voltage capacitor core package in parallel; the high-voltage capacitor parallel unit includes two high-voltage capacitor core packages which are connected in parallel, the two high-voltage capacitor core packages connected in parallel, as a whole, are wrapped by a polypropylene (PP) film insulation layer and a red copper foil, and the red copper foil is connected with axial end surfaces positioned at the front and rear ends of the two high-voltage capacitor core packages. Actually in the abovementioned structure, one electrode passes through the axes of all capacitor core packages, the cylindrical surface of the whole capacitor serves as the other electrode, and the two electrodes radially pass through all capacitor core packages to connect them in parallel.

Furthermore, a hexagonal through hole is provided in the axis of each high-voltage capacitor core package, a red copper electrode A is provided on one axial end surface of the high-voltage capacitor core package, and a hexagonal stud A is provided in the middle of the inside of the red copper electrode A and is inserted into the hexagonal through hole; and a red copper electrode B is provided on the other axial end surface of each high-voltage capacitor core package.

Furthermore, in the high-voltage capacitor parallel units, red copper electrodes A are respectively provided on two opposite axial end surfaces of two adjacent high-voltage capacitor core packages, a hexagonal stud A is provided in the middle of the inside of the red copper electrode A and is inserted into the hexagonal through hole; and red copper electrodes B are respectively provided on two non-adjacent axial end surfaces of two adjacent high-voltage capacitor core packages.

Furthermore, two adjacent high-voltage capacitor core packages are fixedly connected by the red copper studs A and the hexagonal studs A arranged in the middle of the inside of the red copper electrodes A.

Furthermore, the high-voltage capacitor parallel units are wrapped by several PP film layers, and then are wrapped by a red copper foil in the outermost layer, and the red copper foil is connected with the red copper electrode B at the outer end of the two high-voltage capacitor core packages to form the high-voltage capacitor parallel units. The high-voltage capacitor parallel units are important units of the high-voltage pulse discharging capacitor of the disclosure, and standardization of production and machining can be ensured, reliability can be improved and the costs can be reduced by using the high-voltage capacitor parallel units to assemble the high-voltage pulse discharging capacitor.

Furthermore, two adjacent high-voltage capacitor parallel units are connected by the red copper studs B, and two ends of the red copper stud B respectively pass through the hexagonal through holes to be threadedly connected with the hexagonal studs A.

Furthermore, the entirety of the high-voltage capacitor parallel units connected in parallel is connected with the high-voltage capacitor core package by red copper studs C, and two ends of the red copper stud C respectively pass through the hexagonal through holes to be threadedly connected with the hexagonal studs A and hexagonal studs B.

Preferably, the red copper electrodes A and red copper electrodes B may be cross-fan-shaped or asterisk-shaped.

Preferably, the hexagonal studs A are made of brass.

The manufacturing method of the high-voltage pulse discharging capacitor comprises the following steps of:

step 1), after a high-voltage capacitor core package is wound, pre-spraying a metal layer on one end surface firstly, fixing cross-fan-shaped or asterisk-shaped red copper electrodes A welded with the hexagonal studs A on the surface of the metal spraying layer, and inserting the hexagonal studs A on the red copper electrodes A into hexagonal through holes of the high-voltage capacitor core package while conducting the fixing;

step 2), performing metal spraying again to tightly connect the red copper electrodes A with the pre-spraying metal layer;

step 3), pre-spraying a metal layer on the other end surface of the high-voltage capacitor core package and fixing the red copper electrodes B on the surface of the metal spraying layer;

step 4), performing metal spraying again to tightly connect the red copper electrodes B with the pre-spraying metal, thereby finishing the machining of the high-voltage capacitor core package;

step 5), oppositely placing the end surfaces of two machined high-voltage capacitor core packages with red copper electrodes A, respectively screwing the red copper studs A into the threads of the hexagonal studs A inside the red copper electrodes A of the two high-voltage capacitor core packages, and axially connecting and fixing the two high-voltage capacitor core packages after the red copper studs A are screwed; then wrapping the entirety of the two connected high-voltage capacitor core packages with a plurality of PP film layers; further wrapping an insulation layer of the PP films with a layer of red copper foil, and connecting the copper foil to red copper electrodes B positioned on outer end surfaces at the front and rear ends of the two high-voltage capacitor core packages, thereby finishing the manufacturing of the high-voltage capacitor parallel units;

step 6), connecting the manufactured high-voltage capacitor parallel units in parallel; fixing two adjacent high-voltage capacitor parallel units with red copper studs B to serve as one electrode of the parallel capacitor; connecting the red copper foils at the outmost layers of two adjacent high-voltage capacitor parallel units to serve as the other electrode of the parallel capacitor; and step 7), connecting the entirety of the high-voltage capacitor parallel units connected in parallel with the high-voltage capacitor core packages in parallel; fixing the entirety of the several high-voltage capacitor parallel units connected in parallel with the high-voltage capacitor core packages by red copper studs C to serve as one electrode of the high-voltage pulse discharging capacitor; connecting the red copper electrodes B at the outer end surfaces of the high-voltage capacitor core packages with the red copper foil wrapping the entirety of the several high-voltage capacitor parallel units connected in parallel to serve as the other electrode of the high-voltage pulse discharging capacitor, thereby finishing the manufacturing of the high-voltage pulse discharging capacitor.

Technical Effect

The disclosure has the following beneficial effects: the problem that the high-voltage capacitor with a slender structure cannot be connected in parallel is solved, and since all high voltage core packages are connected in parallel, the total loss of the capacitor is small. In addition, as the internal resistance of a capacitor with the parallel-connected structure is smaller than that of a capacitor with a serial-connected structure, the internal resistance of the inventive capacitor is smaller, which reduces the heat during the use of the inventive capacitor, and greatly prolongs the service life of the high-voltage pulse discharging capacitor.

BRIEF DESCRIPTION OF THE DRAWINGS

The disclosure will be further described in detail in combination with the drawings.

In the figures,

1, capacitor body; 2, high-voltage capacitor parallel unit; 3, high-voltage capacitor core package; 4, hexagonal through hole; 5, red copper electrode; 6, hexagonal stud A; 7, hexagonal stud B; 8, red copper electrode B; 9, red copper stud A; 10, red copper stud A fixing hole; 11, red copper stud B; 12, red copper stud C; 13, PP film; 14, red copper foil.

DETAILED DESCRIPTION OF THE INVENTION

Embodiment I

Figure 1:
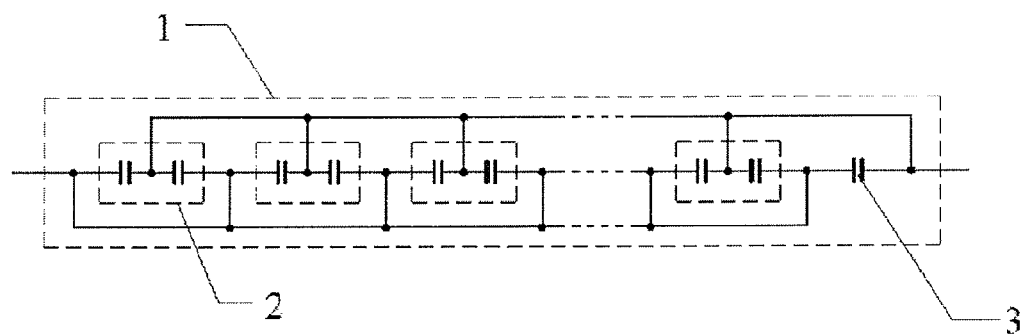
FIG. 1 is a diagram of the connection circuit of high-voltage capacitor parallel units of a high-voltage pulse discharging capacitor as described in an embodiment of the disclosure.

In a case where a high-voltage pulse discharging capacitor is formed by two high-voltage capacitor parallel units and one high-voltage capacitor core package and the high-voltage capacitor parallel unit is formed by two high-voltage capacitor core packages:

as shown in FIG. 1, the high-voltage pulse discharging capacitor as described in the embodiment comprises a capacitor body 1, which is formed by several high-voltage capacitor parallel units 2 and a high-voltage capacitor core package 3; the several high-voltage capacitor parallel units 2 are connected in parallel, the entirety of the high-voltage capacitor parallel units connected in parallel is connected with the high-voltage capacitor core package 3 in parallel; the high-voltage capacitor parallel unit 2 includes two high-voltage capacitor core packages 3 which are connected in parallel.

Figure 2:
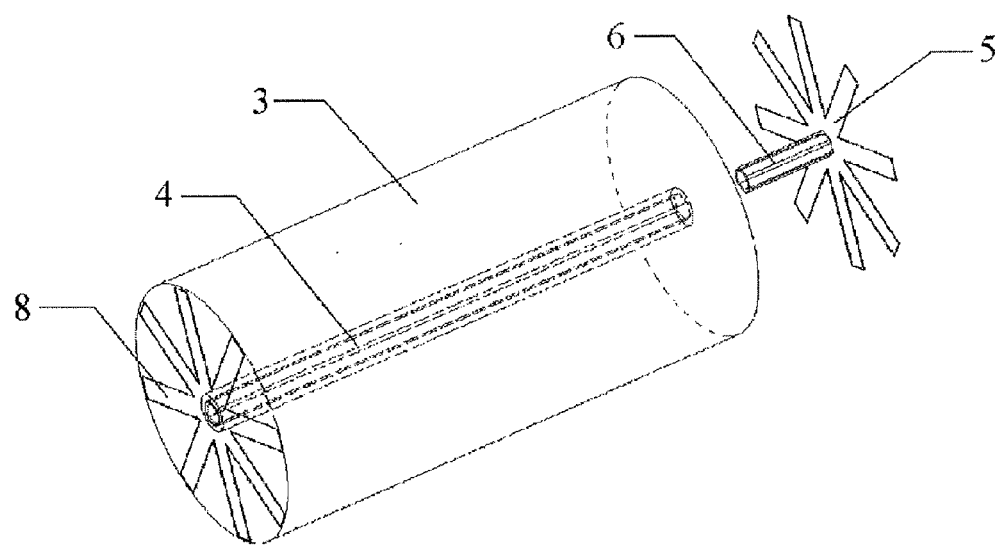
FIG. 2 is a structural diagram of a high-voltage capacitor core package as described in an embodiment of the disclosure.

As shown in FIG. 2, a hexagonal through hole 4 is provided in the axis of each high-voltage capacitor core package 3, a red copper electrode A5 is provided on one axial end surface of the high-voltage capacitor core package, a hexagonal stud A6 is connected in the middle of the inside of the red copper electrode A5 and is inserted into the hexagonal through hole 4, and the red copper electrode A5 is connected with a metal spraying layer on the end surface of the high-voltage capacitor core package; a red copper electrode B8 is provided at the other axial end surface of each high-voltage capacitor core package.

Figure 3:
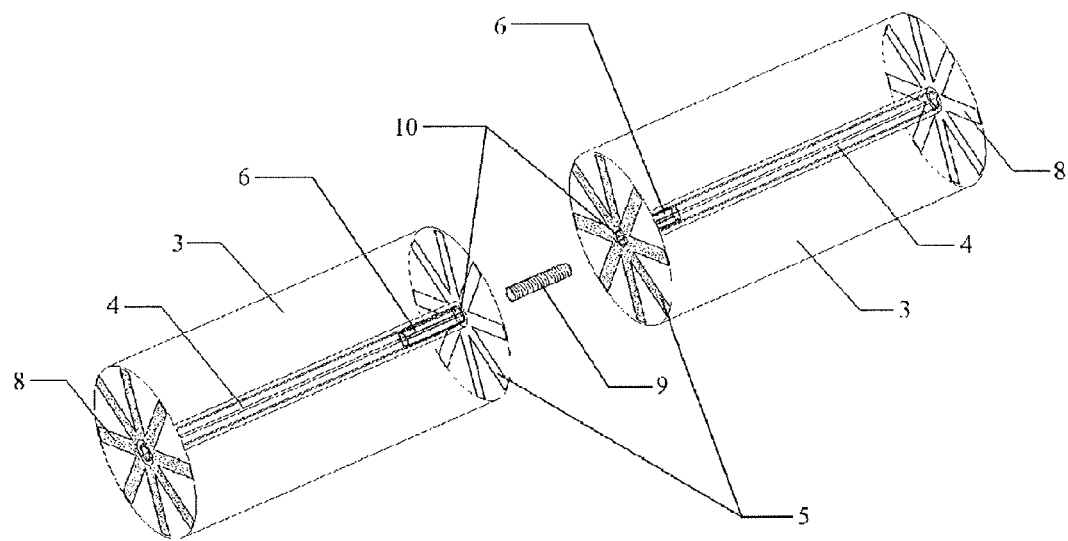
FIG. 3 is a structural schematic diagram of a high-voltage capacitor parallel unit formed by two high-voltage capacitor core packages in an embodiment of the disclosure.
Figure 3:
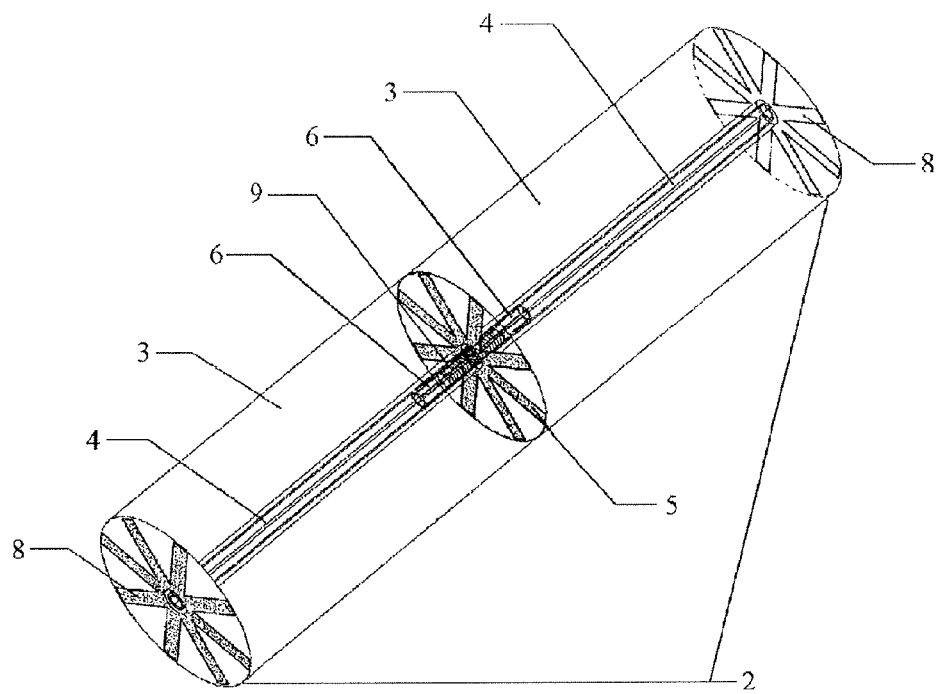

As shown in FIG. 3, two high-voltage capacitor core packages constitute one high-voltage capacitor parallel unit 2; hexagonal through holes 4 are provided in the middle of both the two high-voltage capacitor core packages 3, red copper electrodes A5 are respectively provided on two opposite axial end surfaces of the two high-voltage capacitor core packages 3, hexagonal studs A6 are provided in the middle of the inside of the red copper electrodes A5, and the hexagonal studs A6 are inserted into the hexagonal through holes 4; and two high-voltage capacitor core packages 3 are fixedly connected by red copper studs A9 and red copper stud A fixing holes 10 provided in the middle of the inside of the red copper electrodes A5. The hexagonal studs A6 serve as one electrode of the high parallel unit 2 and can be led out via the hexagonal through holes 4.

Figure 4:
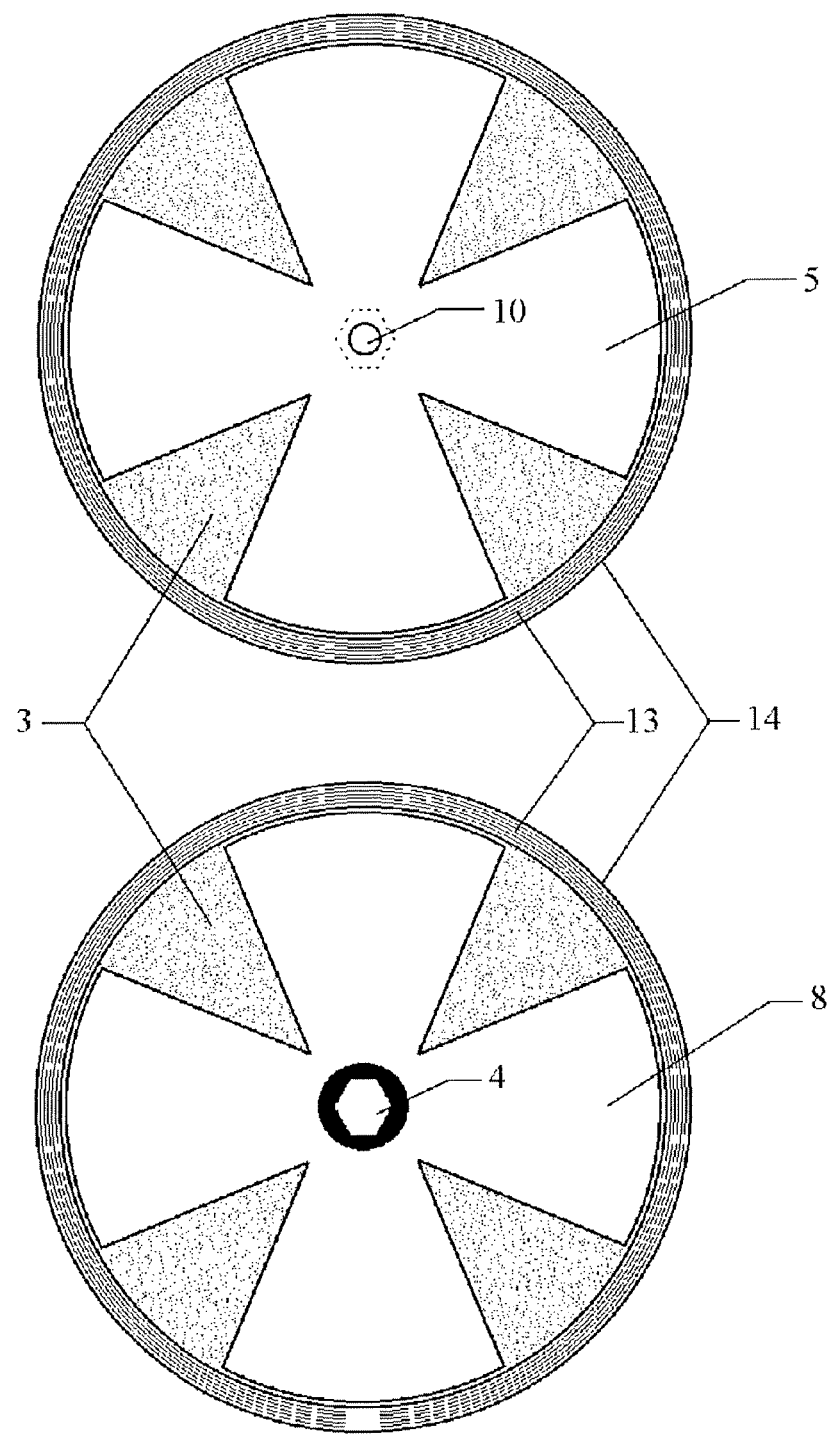
FIG. 4 is a schematic diagram of an axial end surface of the high-voltage capacitor parallel unit as described in an embodiment of the disclosure.

As shown in FIG. 4, after the two high-voltage capacitor core packages are axially connected by the red copper studs A9, they are firstly wrapped by several polypropylene (PP) films 12 outside in the radial direction, and are then wrapped by red copper foils 14 at the outmost layer, the red copper foils 14 are connected with red copper electrodes B8 located at the front and rear end surfaces of the two high-voltage capacitor core packages, which is the other electrode of the high-voltage capacitor parallel unit 2. The thickness or number of layers of the PP film 13 should ensure sufficient insulation strength between the red copper foil 14 and the red copper electrodes A5 at the other electrode of the high-voltage capacitor parallel unit 2. A film made of a material such as polyvinyl chloride (PVC), poly ethylene (PE) and Teflon can be adopted as an insulation material, and the thickness of the insulating layer should ensure sufficient insulation strength between the red copper foils 14, the red copper electrodes A5 and the high-voltage capacitor core packages 3. The red copper foil 14 and the red copper electrodes B8 at two ends of the manufactured high-voltage capacitor parallel unit are one electrode, and the red copper electrodes A5 at the center and the hexagonal studs A6 are the other electrode, and this electrode can be led out from the hexagonal through holes 4 of the two high-voltage capacitor core packages.

Figure 5:
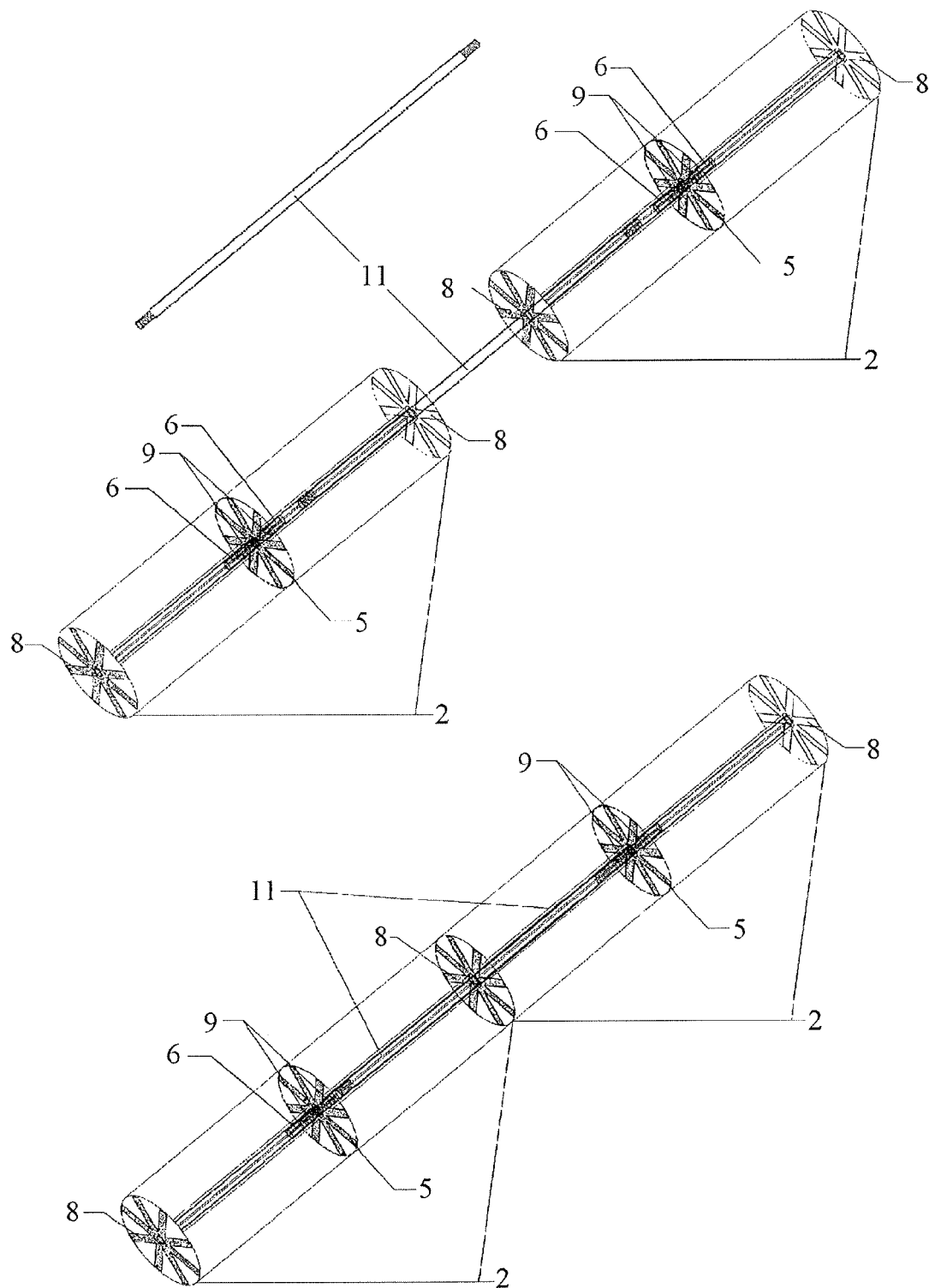
FIG. 5 is a schematic diagram of the connecting of two high-voltage capacitor parallel units in FIG. 3.

As shown in FIG. 5, the two high-voltage capacitor parallel units 2 are axially connected by the red copper studs B11, the two ends of the red copper studs B11 pass through the hexagonal through holes 4 respectively to be threadedly connected with the hexagonal studs A6. The red copper studs B11 play a role in fixedly connecting the two high-voltage capacitor parallel units on one hand, and also play a role of connecting internal electrodes in the two high-voltage capacitor parallel units on the other hand. The red copper foils outside the two high-voltage capacitor parallel units are welded together as one electrode of the parallel-connected capacitor, and the red copper electrodes A5, the hexagonal studs A6 and the red copper studs B11 are the other electrode of the entirety of the two high-voltage capacitor parallel units, which is led out from the hexagonal through holes 4.

Figure 6:
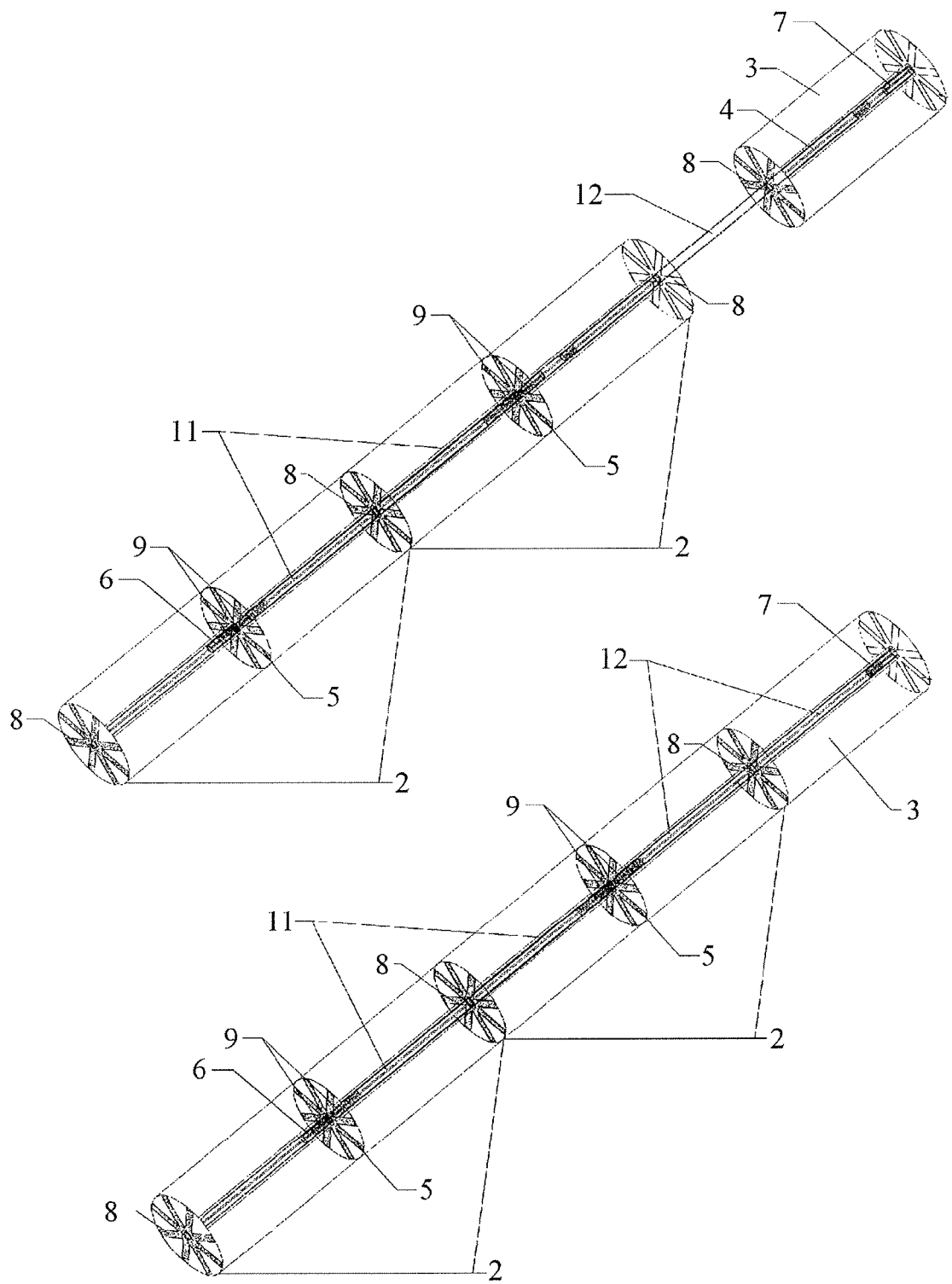
FIG. 6 is a schematic diagram of the connection in a case where the high-voltage pulse discharging capacitor is formed by two high-voltage capacitor parallel units and one high-voltage capacitor core package.

As shown in FIG. 6, the entirety of the high-voltage capacitor parallel units 2 connected in parallel and the high-voltage capacitor core packages 3 are connected by red copper studs C12, and two ends of the red copper studs C12 respectively pass through the hexagonal through holes 4 of the high-voltage capacitor parallel units and the hexagonal through holes 4 in the axes of the high-voltage capacitor core packages 3 to be threadedly connected with the hexagonal studs A6 and the hexagonal studs 7 respectively. The red copper studs C12 also play a role of connecting and fixing the high-voltage capacitor core packages 3 and the entirety of the high-voltage capacitor parallel units connected in parallel and leading out the electrodes. The red copper electrodes A5 on the high-voltage capacitor core packages 3 serve as one electrode of the capacitor body 1, and after the red copper electrodes B8 at the axial end surfaces of the high-voltage capacitor core packages 3 and the two high-voltage capacitor parallel units 2 are connected in parallel, the red copper foils 14 outside the entirety are connected to serve as the other electrode of the capacitor body. Thus, the high-voltage pulse discharging capacitor constituted by two high-voltage capacitor parallel units and one high-voltage capacitor core package is completed.

Figure 7:
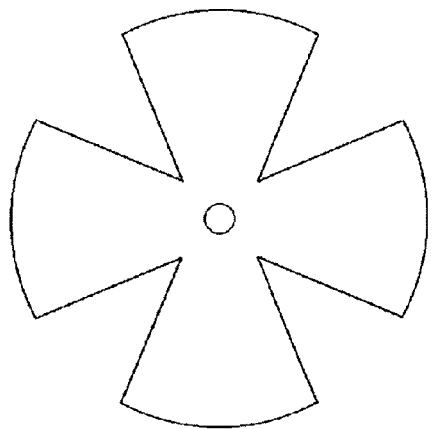
FIG. 7 is a schematic diagram of the shape of a terminal leading-out electrode of the high-voltage capacitor core package.
Figure 7:
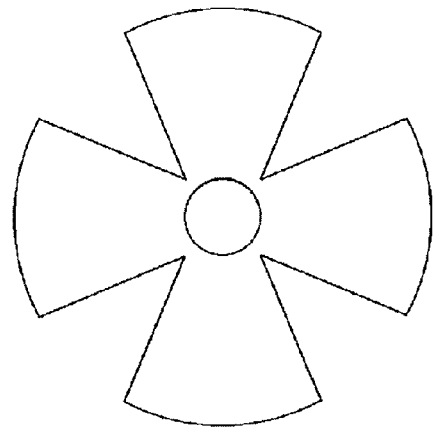
Figure 7:
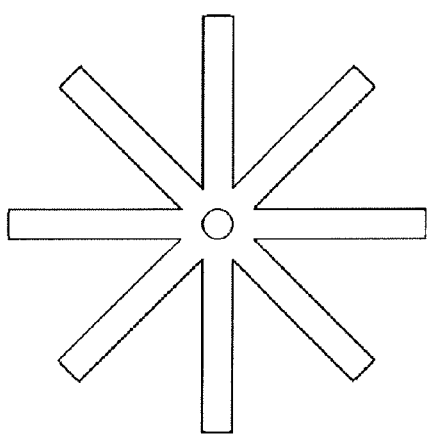
Figure 7:
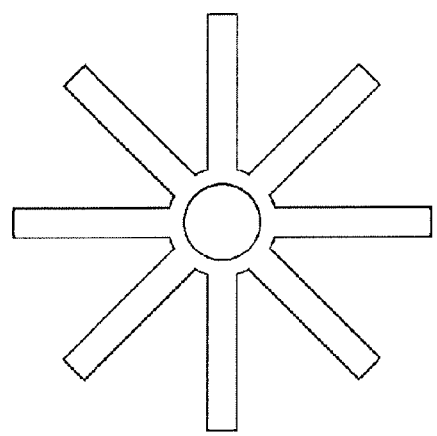

The red copper electrodes A5 and the red copper electrodes B8 are cross-shaped or asterisk-shaped, as shown in FIG. 7. The use of the red copper electrodes aims to reduce resistance of the metal spraying layer and if red copper mesh electrodes are used, the effect is better.

A manufacturing method of the high-voltage pulse discharging capacitor comprises the following steps of:

step 1), after one high-voltage capacitor core package is wound, pre-spraying a metal layer on one end surface of the high-voltage capacitor core package 3 firstly, fixing the cross-shaped or asterisk-shaped red copper electrodes A5 welded with the hexagonal studs A6 on the surface of the metal spraying layer, and inserting the hexagonal studs A6 on the red copper electrodes A5 into the hexagonal through holes 4 on the high-voltage capacitor core package 3 while fixing; the red copper foils can be fixed by methods such as soldering, resistance welding, stored energy welding, ultrasonic welding and bonding;

step 2), performing metal spraying again to tightly connect the red copper electrodes A5 with the pre-spraying metal layer;

step 3), pre-spraying the other metal layer on the other end surface of the high-voltage capacitor core package 3 and fixing the red copper electrodes B8 on the surface of the metal spraying layer; the red copper foils can be fixed by methods such as soldering, resistance welding, stored energy welding, ultrasonic welding and bonding;

step 4), performing metal spraying again to tightly connect the red copper electrodes B8 with the pre-spraying metal, thereby finishing the machining of the high-voltage capacitor core package 3;

step 5), axially and oppositely arranging the end surfaces of the red copper electrodes A5 of the two machined high-voltage capacitor core packages 3, respectively screwing the red copper studs A9 into the red copper stud A fixing holes 10 of the hexagonal studs 6 inside the red copper electrodes A of the two high-voltage capacitor core packages and axially and tightly connecting and fixing the two high-voltage capacitor core packages after the red copper studs A9 are screwed; wrapping the two capacitors with several PP film layers to serve as an insulating layer; wrapping the PP films 13 with a red copper foil layer 14, and welding the red copper foils 14 with the red copper electrodes B8 located at the front and rear end surfaces of the two high-voltage capacitor core packages as one electrode of the high-voltage capacitor parallel unit 2, wherein the thickness or the number of wrapping layers of the PP films should ensure sufficient insulation strength between the red copper foils 14 wrapped outside and the red copper electrodes A5 at the other electrode of the high-voltage capacitor parallel unit, i.e., ensure that no breakdown occurs between the red copper foils 14 and the red copper electrodes A5, thereby finishing the manufacturing of the high-voltage capacitor parallel unit 2;

step 6), connecting the two manufactured high-voltage capacitor parallel units 2 in parallel; fixing the two high-voltage capacitor parallel units 2 with the red copper studs B11, and welding the red copper foils outside the two adjacent high-voltage capacitor parallel units together; and step 7), connecting the entirety of the high-voltage capacitor parallel units 2 connected in parallel with the high-voltage capacitor core packages 3 in parallel; fixing the entirety of the high-voltage capacitor parallel units 2 connected in parallel with the high-voltage capacitor core packages 3 with red copper studs C 12, thereby five pairs of red copper electrodes A5 and red copper electrode B8 of the five high-voltage capacitor core packages 3 are connected respectively, and the manufacturing of the high-voltage pulse discharging capacitor is finished.

Embodiment II

In a case where a high-voltage pulse discharging capacitor is formed by three high-voltage capacitor parallel units 2 and one high-voltage capacitor core package 3, and the high-voltage capacitor parallel unit 2 is formed by two high-voltage capacitor core packages 3:

as shown in FIG. 1, the high-voltage pulse discharging capacitor as described in the embodiment comprises a capacitor body 1, which is constituted by several high-voltage capacitor parallel units 2 and a high-voltage capacitor core package 3; the several high-voltage capacitor parallel units 2 are connected in parallel, the entirety of the high-voltage capacitor parallel units connected in parallel is connected with the high-voltage capacitor core package 3 in parallel; the high-voltage capacitor parallel unit 2 includes two high-voltage capacitor core packages 3 which are axially connected in parallel, the entirety of the high-voltage capacitor core packages connected in parallel is wrapped by PP films and copper foils, and the copper foils are connected with the end surfaces outside the high-voltage capacitor core packages at the front and rear ends.

As shown in FIG. 2, a hexagonal through hole 4 is provided in the axis of each high-voltage capacitor core package 3, a red copper electrode A5 is provided at one axial end surface of the high-voltage capacitor core package, a hexagonal stud A6 is connected in the middle of the inside of the red copper electrode A5 and is inserted into the hexagonal through hole 4 and the red copper electrode A5 is connected with a metal spraying layer at the end surface of the high-voltage capacitor core package; and a red copper electrode B8 is provided at the other axial end surface of the high-voltage capacitor core package.

As shown in FIG. 3, two high-voltage capacitor core packages form one high-voltage capacitor parallel unit 2; hexagonal through holes 4 are formed in the middle of the two high-voltage capacitor core packages 3, red copper electrodes A5 are provided at two opposite axial end surfaces of the two high-voltage capacitor core packages 3, hexagonal studs A6 are provided in the middle of the inside of the red copper electrodes A5, and the hexagonal studs A6 are inserted into the hexagonal through holes 4; and two high-voltage capacitor core packages 3 are fixedly connected by red copper studs A9 and red copper stud A fixing holes 10 formed in the middle of the inside of the red copper electrodes A6. The hexagonal studs A6 are one electrode of the high parallel unit 2 and can be led out via the hexagonal through holes 4.

As shown in FIG. 4, after the two high-voltage capacitor core packages are axially connected by the red copper studs A9, they are firstly wrapped by several PP films 13 in the radial direction, and are then wrapped by red copper foils 14 at the outmost layer, the red copper foils 14 are connected with red copper electrodes B8 located at the front and rear end surfaces of the two high-voltage capacitor core packages, which is the other electrode of the high-voltage capacitor parallel unit 2. The thickness or number of layers of the PP film 13 should ensure sufficient insulation strength between the red copper foils 14 and the red copper electrodes A5 at the other electrode of the high-voltage capacitor parallel unit 2. A film made of a material such as PVC), PE and Teflon can be adopted as an insulation material, and the thickness of the insulating layer should ensure sufficient insulation strength between the red copper foils 14, the red copper electrodes A5 and the high-voltage capacitor core packages 3.

Figure 9:
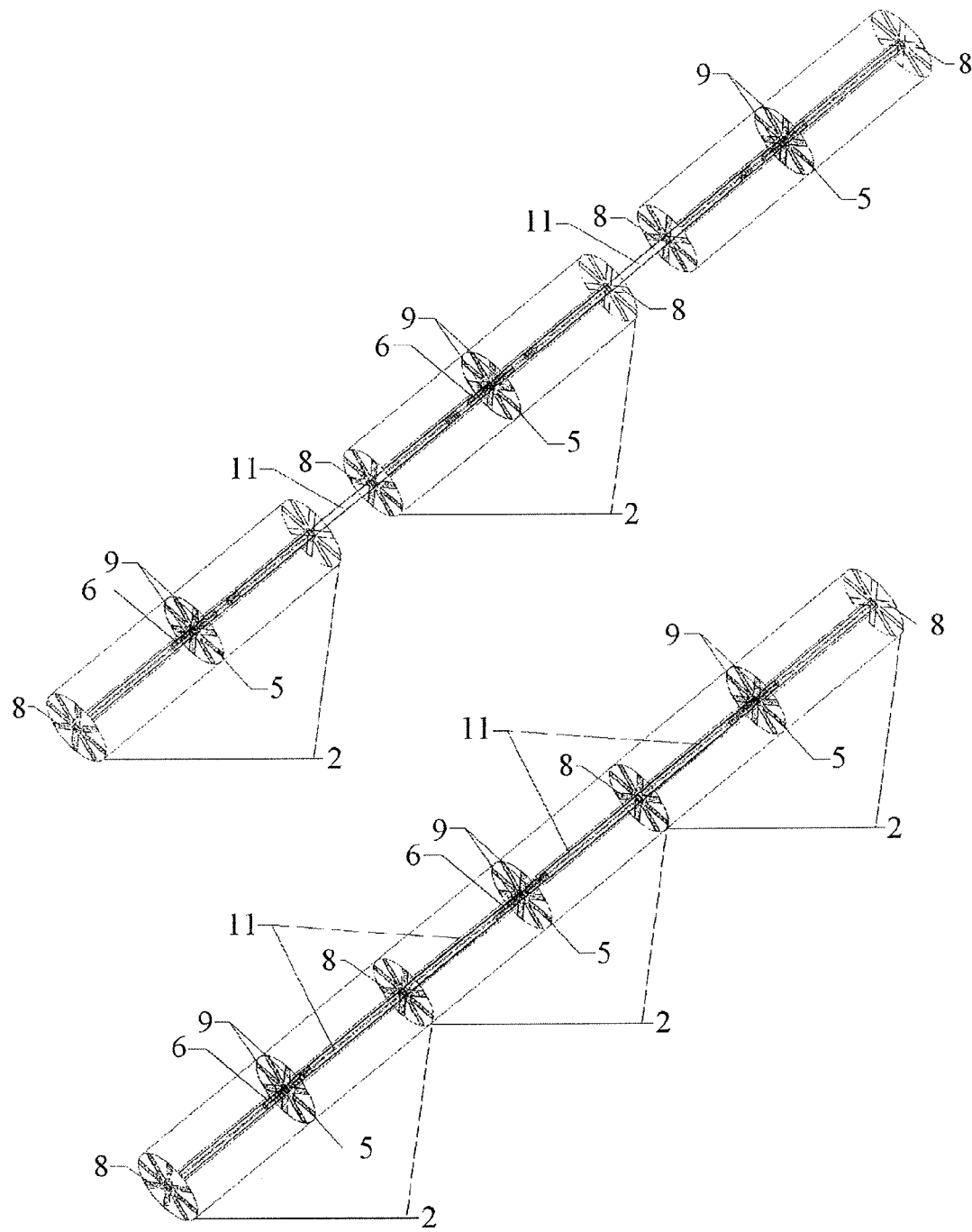
FIG. 9 is a schematic diagram of the connection of three high-voltage capacitor parallel units in FIG. 8.

As shown in FIG. 9, every two of the three high-voltage capacitor parallel units 2 are axially connected by two red copper studs B11, and the two ends of the red copper studs B11 pass through hexagonal through holes 4 respectively to be threadedly connected with the hexagonal studs A6. The two red copper studs B11 play a role of connecting and fixing the three high-voltage capacitor parallel units and connecting internal electrodes. The red copper foils outside the three high-voltage capacitor parallel units are welded together to serve as one electrode and the hexagonal studs A6 serve as the other electrode of the parallel-connected capacitor.

Figure 8:
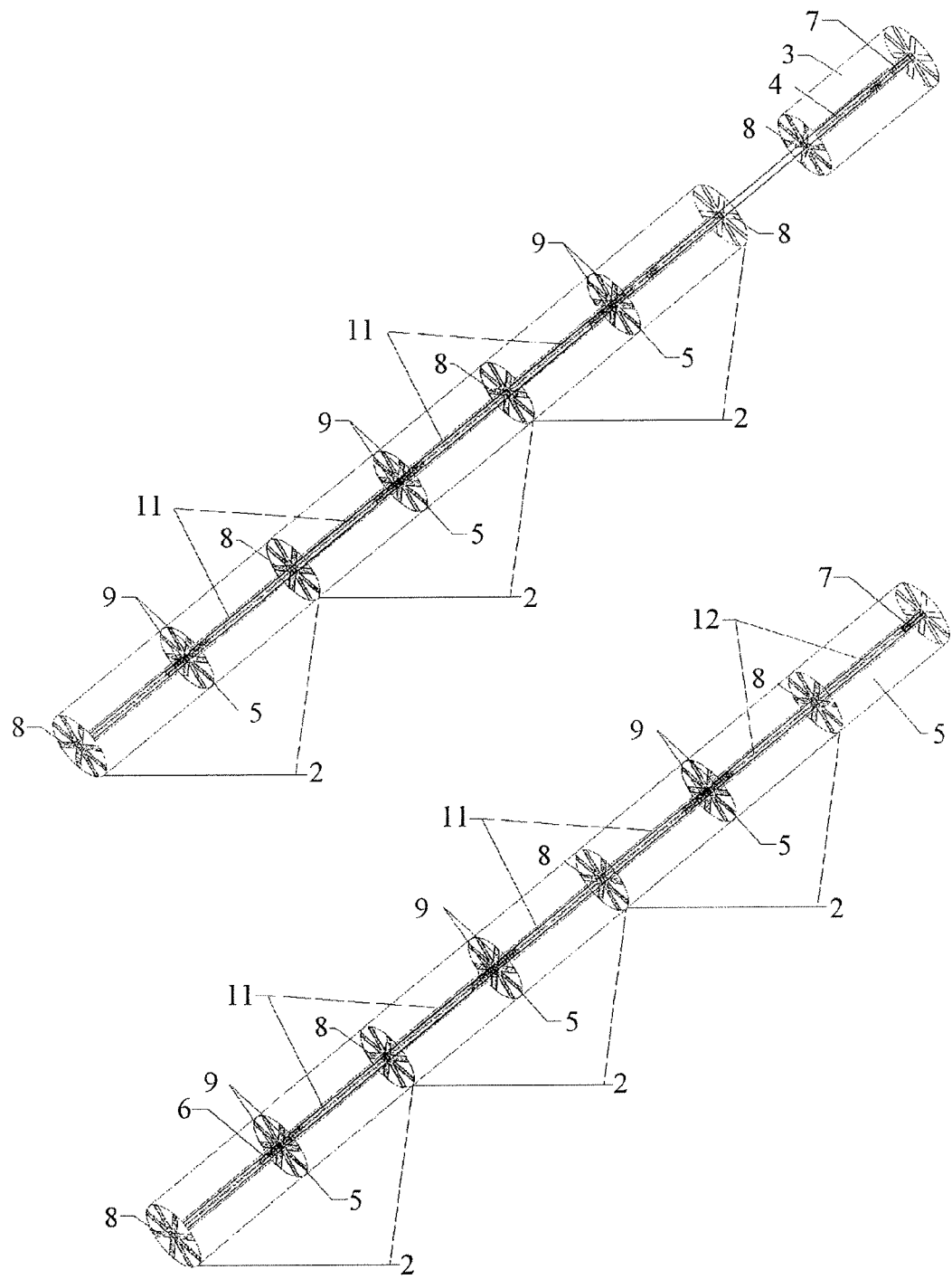
FIG. 8 is a schematic diagram of the connection in a case where the high-voltage pulse discharging capacitor is formed by three high-voltage capacitor parallel units and one high-voltage capacitor core package in an embodiment of the disclosure.

As shown in FIG. 8, the entirety of very two of the three high-voltage capacitor parallel units 2 connected in parallel is connected with the high-voltage capacitor core packages 3 by red copper studs C12, and two ends of the red copper studs C12 respectively pass through the hexagonal through holes 4 of the high-voltage capacitor parallel units and the hexagonal through holes 4 in the axes of the high-voltage capacitor core packages 3 to be threadedly connected with the hexagonal studs A6 and the hexagonal studs 7. The red copper electrodes A5 on the high-voltage capacitor core packages 3 serve as one electrode of the capacitor body 1, and after the red copper electrodes B8 at the axial end surfaces of the high-voltage capacitor core packages 3 and the two high-voltage capacitor parallel units 2 are connected in parallel, the red copper foils wrapped outside the entirety are connected as the other electrode of the capacitor body. Thereby, the high-voltage pulse discharging capacitor constituted by three high-voltage capacitor parallel units and one high-voltage capacitor core package is completed. Actually, three high-voltage capacitor parallel units can also form the high-voltage pulse discharging capacitor.

The red copper electrodes A5 and the red copper electrodes B8 are cross-shaped or asterisk-shaped, as shown in FIG. 7.

A manufacturing method of the high-voltage pulse discharging capacitor comprises the following steps of:

step 1), after one high-voltage capacitor core package is wound, pre-spraying a metal layer on one end surface of the high-voltage capacitor core package 3 firstly, fixing the cross-shaped or asterisk-shaped red copper electrodes A5 welded with the hexagonal studs A6 on the surface of the metal spraying layer, and inserting the hexagonal studs A6 on the red copper electrodes A5 into the hexagonal through holes 4 on the high-voltage capacitor core package 3 while fixing, wherein, the red copper foils can be fixed by methods such as soldering, resistance welding, stored energy welding, ultrasonic welding and bonding;

step 2), performing metal spraying again to tightly connect the red copper electrodes A5 with the pre-spraying metal layer;

step 3), pre-spraying the other metal layer on the other end surface of the high-voltage capacitor core package 3 and fixing the red copper electrodes B8 on the surface of the metal spraying layer, wherein the red copper foils can be fixed by methods such as soldering, resistance welding, stored energy welding, ultrasonic welding and bonding;

step 4), performing metal spraying again to tightly connect the red copper electrodes B8 with the pre-spraying metal, thereby finishing the machining of the high-voltage capacitor core package 3;

step 5), axially and oppositely arranging the surfaces of the red copper electrodes A5 of the two machined high-voltage capacitor core packages, screwing the red copper studs A9 into the red copper stud A fixing holes 10 of the hexagonal studs 6 inside the red copper electrodes A of the two high-voltage capacitor core packages respectively and axially and tightly connecting and fixing the two high-voltage capacitor core packages after the red copper studs A9 are screwed; wrapping the two capacitors with several PP film layers to serve as an insulating layer; wrapping the PP films 13 with a red copper foil layer 14, and welding the red copper foils 14 with the red copper electrodes B8 located at the front and rear end surfaces of the two high-voltage capacitor core packages to serve as one electrode of the high-voltage capacitor parallel unit 2, wherein the thickness or number of wrapping layers of the PP films should ensure sufficient insulation strength between the red copper foils 14 wrapping outside and the red copper electrodes A at the other electrode of the high-voltage capacitor parallel unit, i.e., ensure that no breakdown occurs between the red copper foils 14 and the red copper electrodes A, thereby finishing the manufacturing of the high-voltage capacitor parallel unit 2;

step 6), connecting the three manufactured high-voltage capacitor parallel units 2 in parallel; fixing every two of the three high-voltage capacitor parallel units 2 with the red copper studs B 11, and welding the red copper foils outside the two adjacent high-voltage capacitor parallel units together; and step 7), connecting the entirety of the parallel-connected high-voltage capacitor parallel units 2 with the high-voltage capacitor core packages 3 in parallel; fixing the entirety of the parallel-connected high-voltage capacitor parallel units 2 with the high-voltage capacitor core packages 3 with red copper studs C 12, thus seven pairs of red copper electrodes A5 and red copper electrode B8 of the 7 high-voltage capacitor core packages 3 are connected respectively, and the manufacturing of the high-voltage pulse discharging capacitor is finished.

In actual production, the number of the high-voltage capacitor parallel units 2 is optimally 8, namely, the high-voltage pulse discharging capacitor is formed by connecting 17 high-voltage capacitor core packages 3 in parallel. Moreover, according to needs of clients, the high-voltage capacitor parallel unit 2 can be configured to be constituted by multiple high-voltage capacitor core packages 3 instead of 2 high-voltage capacitor core packages 3.

In actual production, the red copper electrodes A5 and the red copper electrodes B8 at two ends of the high-voltage capacitor 3 can be connected in a method of direct soldering or spot welding and can be round, so the machining process of the red copper electrodes is greatly simplified. Generally, the operation of directly spot-welding the red copper electrodes A5 and the red copper electrodes B8 on the metal spraying layer can meet the requirement of leading out the high-voltage capacitor core packages 3.

In the disclosure, all the high-voltage capacitor core packages are connected in parallel, so the total loss of the capacitor is very small, if the capacitor is formed by N high-voltage capacitor core packages, the internal resistance of the capacitor with a parallel connected structure is N times smaller than that of the capacitor with a serial connected structure, the internal resistance of the capacitor is small, and the heat during use of the capacitor is less and the service life of the capacitor is greatly prolonged.

The disclosure is not limited to the above preferred embodiments, and anyone can obtain products of various forms under the inspiration of the disclosure. However, all technical schemes that are the same as or similar to the disclosure shall fall into the protection scope of the disclosure, regardless any variation in shape or structure.

The invention claimed is:

1. A high-voltage pulse discharging capacitor, comprising a capacitor body, wherein the capacitor body comprises a plurality of high-voltage capacitor parallel units and a high-voltage capacitor core package; the plurality of high-voltage capacitor parallel units are connected in parallel, and the high-voltage capacitor parallel units connected in parallel, as a whole, are connected with the high-voltage capacitor core package in parallel; the high-voltage capacitor parallel unit includes two or more high-voltage capacitor core packages which are connected in parallel, the two or more high-voltage capacitor core packages connected in parallel are integrally wrapped by an insulation layer and a foil, and the foil is connected with axial end surfaces positioned at front and rear ends of the two or more high-voltage capacitor core packages.

2. The high-voltage pulse discharging capacitor according to claim 1, wherein a hexagonal through hole is provided in an axis of the high-voltage capacitor core package, an electrode A is provided on one axial end surface of the high-voltage capacitor core package, and a hexagonal stud A is provided in the middle of the inside of the electrode A and is inserted into the hexagonal through hole; and an electrode B is provided on the other axial end surface of the high-voltage capacitor core package.

3. The high-voltage pulse discharging capacitor according to claim 2, wherein the electrodes A are respectively provided on two opposite axial end surfaces of two adjacent high-voltage capacitor core packages, a hexagonal stud A is provided in the middle of the inside of the electrode A and is inserted into the hexagonal through hole; and the electrodes B are respectively provided on two non-adjacent axial end surfaces of two adjacent high-voltage capacitor core packages.

4. The high-voltage pulse discharging capacitor according to claim 3, wherein, two adjacent high-voltage capacitor core packages are fixedly connected by the studs A and the hexagonal studs A arranged in the middle of the inside of the electrodes A to constitute the high-voltage capacitor parallel units; the high-voltage capacitor parallel units are wrapped by a plurality of PP film layers and are further wrapped by a foil in the outermost layer, and the foil is connected with the electrode B at the outer end of the two or more high-voltage capacitor core packages.

5. The high-voltage pulse discharging capacitor according to claim 4, wherein two adjacent high-voltage capacitor parallel units are connected by the studs B, and two ends of the stud B respectively pass through the hexagonal through holes to be threadedly connected with the hexagonal studs A.

6. The high-voltage pulse discharging capacitor according to claim 5, wherein the high-voltage capacitor parallel units connected in parallel are integrally connected with the high-voltage capacitor core package by studs C, and two ends of the stud C respectively pass through the hexagonal through holes to be threadedly connected with the hexagonal studs A and hexagonal studs B.

7. The high-voltage pulse discharging capacitor according to claim 6, wherein the electrodes A and electrodes B are cross-fan-shaped or asterisk-shaped.

8. A manufacturing method of the high-voltage pulse discharging capacitor according to claim 1, comprising:
 step 1) of, after a high-voltage capacitor core package is wound, pre-spraying a metal layer on one end surface firstly, fixing cross-fan-shaped or asterisk-shaped electrodes A welded with the hexagonal studs A on the surface of the metal spraying layer, and inserting the hexagonal studs A on the electrodes A into hexagonal through holes of the high-voltage capacitor core package while conducting the fixing;
 step 2) of performing metal spraying again to tightly connect the electrodes A with the pre-spraying metal layer;
 step 3) of pre-spraying a metal layer on the other end surface of the high-voltage capacitor core package and fixing the electrodes B on the surface of the metal spraying layer;
 step 4) of performing metal spraying again to tightly connect the electrodes B with the pre-spraying metal, thereby finishing the machining of the high-voltage capacitor core package;
 step 5) of oppositely placing the end surfaces of two or more machined high-voltage capacitor core packages with electrodes A, respectively screwing the studs A into threads of the hexagonal studs A inside the electrodes A of the two or more high-voltage capacitor core packages, and axially connecting and fixing the two or more high-voltage capacitor core packages after the red-copper studs A are screwed; then wrapping the entirety of the two or more connected high-voltage capacitor core packages with a plurality PP film layers; further wrapping an insulation layer of the PP films with a layer of foil, and connecting the foil to electrodes B positioned on outer end surfaces at the front and rear ends of the two or more high-voltage capacitor core packages, thereby finishing the manufacturing of the high-voltage capacitor parallel units;
 step 6) of connecting the manufactured high-voltage capacitor parallel units in parallel; fixing two adjacent high-voltage capacitor parallel units with studs B to serve as one electrode of the parallel capacitor; connecting the foils at the outmost layers of two adjacent high-voltage capacitor parallel units to serve as the other electrode of the parallel capacitor; and
 step 7) of connecting the entirety of the high-voltage capacitor parallel units connected in parallel with the high-voltage capacitor core packages in parallel; fixing the entirety of the high-voltage capacitor parallel units connected in parallel with the high-voltage capacitor core packages by studs C to serve as one electrode of the high-voltage pulse discharging capacitor; connecting the electrodes B at the outer end surfaces of the high-voltage capacitor core packages with the foil wrapping the entirety of the high-voltage capacitor parallel units connected in parallel to serve as the other electrode of the high-voltage pulse discharging capacitor.

* * * * *